| (12) | United States Patent | (10) Patent No.: | US 9,449,441 B2 |
|---|---|---|---|
| | Hartmann | (45) Date of Patent: | Sep. 20, 2016 |

(54) BODY TRACKING AND IDENTIFICATION SYSTEM AND METHOD

(71) Applicant: Stephen S. Hartmann, Lowell, MI (US)

(72) Inventor: Stephen S. Hartmann, Lowell, MI (US)

( * ) Notice: Subject to any disclaimer, the term of this patent is extended or adjusted under 35 U.S.C. 154(b) by 0 days.

(21) Appl. No.: 14/676,849

(22) Filed: Apr. 2, 2015

(65) Prior Publication Data

US 2015/0287251 A1    Oct. 8, 2015

Related U.S. Application Data

(60) Provisional application No. 61/974,772, filed on Apr. 3, 2014.

(51) Int. Cl.
*G07C 9/00* (2006.01)
*G06Q 10/06* (2012.01)
*G06Q 50/26* (2012.01)

(52) U.S. Cl.
CPC ............ *G07C 9/00* (2013.01); *G06Q 10/063* (2013.01); *G06Q 50/265* (2013.01)

(58) Field of Classification Search
CPC ........... A61B 10/025; A61B 10/0266; G06Q 10/063; G06Q 50/265; G06Q 2007/10504; G06Q 7/1097; G07C 9/00111; G08B 21/0269
USPC ....... 340/539.13, 572.1, 572.4, 573.1, 573.3, 340/825.49, 825.69; 235/375, 385; 600/562, 564; 700/215, 225; 40/632, 40/633
See application file for complete search history.

(56) References Cited

U.S. PATENT DOCUMENTS

| 3,028,070 | A | 4/1962 | Schnur et al. |
|---|---|---|---|
| 5,211,286 | A | 5/1993 | Turner |
| 6,499,658 | B2 | 12/2002 | Goetz et al. |
| 6,645,718 | B2 | 11/2003 | Liu et al. |
| 6,761,312 | B2 | 7/2004 | Piatek et al. |
| 6,857,210 | B2 | 2/2005 | Santa Cruz |
| 6,948,271 | B2 | 9/2005 | Helgeson et al. |
| 7,028,892 | B2 | 4/2006 | Morgan |
| 7,993,282 | B2 | 8/2011 | Long |
| 8,572,823 | B1 | 11/2013 | Fransisco |
| 2004/0160054 | A1 | 8/2004 | Davin |
| 2007/0194099 | A1 | 8/2007 | Miller et al. |
| 2009/0242447 | A1 | 10/2009 | Smart et al. |
| 2011/0220713 | A1 | 9/2011 | Cloninger |
| 2012/0148115 | A1 * | 6/2012 | Birdwell .................. G06K 9/00 382/116 |
| 2013/0131994 | A1 * | 5/2013 | Birdwell ................. G06F 19/22 702/19 |

* cited by examiner

*Primary Examiner* — Hung T Nguyen
(74) *Attorney, Agent, or Firm* — Gardner, Linn, Burkhart & Flory, LLP

(57) ABSTRACT

A method of identifying and tracking victims of a casualty event includes separating a two-part tag into a tag portion and a container portion, each portion including corresponding indicia in human-readable and/or machine-readable form. The tag portion is attached to an individual victim, and the container portion is used to collect a tissue sample from the victim for later analysis and positive identification. A handheld computer may be used to record the tag portion's indicia, and a GPS or other geolocating system allows the computer to also record the present geographical location of the victim. If the victim is later moved, the tag indicia is again scanned and the new location recorded. Once the victim is positively identified, the victim data file is updated and next-of-kin or other interested parties are notified of the current victim location for final disposition of the victim.

17 Claims, 4 Drawing Sheets

BODY TRACKING AND IDENTIFICATION SYSTEM AND METHOD

CROSS REFERENCE TO RELATED APPLICATION

The present application claims the benefit of U.S. provisional application Ser. No. 61/974,772, filed Apr. 3, 2014, which is hereby incorporated herein by reference in its entirety.

FIELD OF THE INVENTION

The present invention relates generally to computer-implemented identification and location tracking systems and methods for victims or casualties of a natural disaster or other high-casualty event.

BACKGROUND OF THE INVENTION

High-casualty events, such as natural disasters, war, plagues, terrorist attacks, and the like give rise to the need for highly efficient processing of deceased bodies and sick or injured survivors by aid workers, at a time when there can be dozens, hundreds, or even many thousands of fatalities and injured or ill persons (collectively referred to herein as "victims"). After or during a high-casualty event, it is very desirable for aid workers to quickly perform triage for survivors, who may be initially treated on-site and later moved for further treatment, and also to separate deceased victims for relatively quick return to living family members and/or for burial or cremation before significant decay occurs. However, when a large number of deceased victims are present, the use of mass graves may be the only practical option to help ensure public safety, particularly during a crisis where significant resources must be prioritized for the health and safety of survivors and time may be a critical factor to minimize further losses. Such quick action often does not permit individual victims to be identified prior to burial or other disposition, so that subsequent positive identification of individual victims can be difficult or impossible, or at least cost-prohibitive, which leaves surviving loved ones uncertain about the fate of a lost relative or friend.

SUMMARY OF THE INVENTION

The present invention provides a body or victim identification and tracking system that enables aid workers to quickly process victims, whether living or deceased, by tagging the victims and taking a tissue sample for use in later positive identification, and then quickly moving to the next victim. Each tag remains with a victim and is resistant to deterioration in the presence of environmental conditions including soil, rain, chemicals, and the like. Preferably, the aid workers are carrying handheld computers that have cameras or other indicia-scanning hardware, as well as GPS or other location-identifying circuitry, for recording the tag indicia and location in a victim data file, which may be uploaded to a central database via wired or wireless communications. If a victim is later moved, the associated tag is again scanned and the new location information recorded, and the victim data file is updated to reflect the new location of the victim. The tissue samples are stored in containers that are associated with respective tags, with correlating indicia present on both the containers and the tags. Although it may take months or even years to complete the identification process, such as via DNA analysis, for the victims of a high-casualty event, when a victim identification is made, the victim data file is updated with that information, and next-of-kin can be notified of the identification and the present location of the victim. If possible, a deceased victim's body may be made available for return of family members, even if the body has been moved multiple times, or even buried, in the time since the casualty event occurred. While it is envisioned that the system would be used primarily to track and identify deceased victims, it can also be used to track and identify living persons who may be incapable of identifying themselves, such as due to a medical condition, and later reunite them with family members.

According to an aspect of the present invention, a body identification and tracking system utilizes a two-part tag, a computer database, handheld computers for scanning and logging data, and associated computer software. The system may utilize a GPS satellite network or other geolocating system, as well as wired or wireless electronic data networks. The two-part tag has a container portion and a cap or closure, and a tag portion that is separable from the container portion. The container and tag portions each have a matching or corresponding human-readable and/or machine-readable identification label or component, such as a barcode, a QR code, an RFID chip, or the like. The identification label or component could also be a raised bar code or other indicia that allows an aid worker to take a "rubbing" of the raised indicia using paper and a suitable marking material, carbon paper, or the like, such as when a functioning electronic scanner is not available to the aid worker. The rubbing can later be scanned once an electric scanner becomes available, or the identification data can be manually entered, if needed.

When an aid worker approaches a living or deceased victim, the aid worker collects a tissue sample, such as a hair or fingernail sample, and places the sample in the container portion of the two-part tag. The aid worker keeps the container portion for later processing at a laboratory, to positively identify the victim. The tag portion of the two-part tag is secured to the victim, or to a bag containing the victim, or to a backboard or other device or object associated with the victim, via any suitable method. The barcode or other indicia of the tag is scanned by handheld computer, such as a smart phone operating a software program, which records the indicia and records the geographical location using an internal GPS or other located system. Optionally, the software program can also store photographs of the victim, other information that is known to the aid worker (e.g., approximate age, height, weight, race, eye color, hair color, tattoos, scars, or other identifying marks, etc.), which can be associated with the scanned code and the geographical location. This information is subsequently uploaded to a centralized computer database via wired or wireless network.

As noted above, the container portion of the two-part tag is transferred to a laboratory for analysis, to make a positive identification of the victim, which may involve comparing the victim's DNA with that of samples provided by living family members. The DNA information is also uploaded to the database, which can be further updated to include the victim's name, contact information of family members, etc. Each time a particular victim is moved, subsequent to the original tagging of the victim, the tag portion that stays with the victim is scanned and the software creates a new entry in the database, indicating the victim's new location and, optionally, the date of the scan, the identity of the person making the scan, or other pertinent information. Assuming that a positive identification of the individual victim is ultimately made, and that living family members or next of kin are identified, the victim may ultimately be collected from its last recorded location for final burial or disposition, or in the case of a surviving victim, may be reunited with the living family members or next of kin.

These and other objects, advantages, purposes and features of the present invention will become apparent upon review of the following specification in conjunction with the drawings.

DESCRIPTION OF THE PREFERRED EMBODIMENTS

Figure 1:
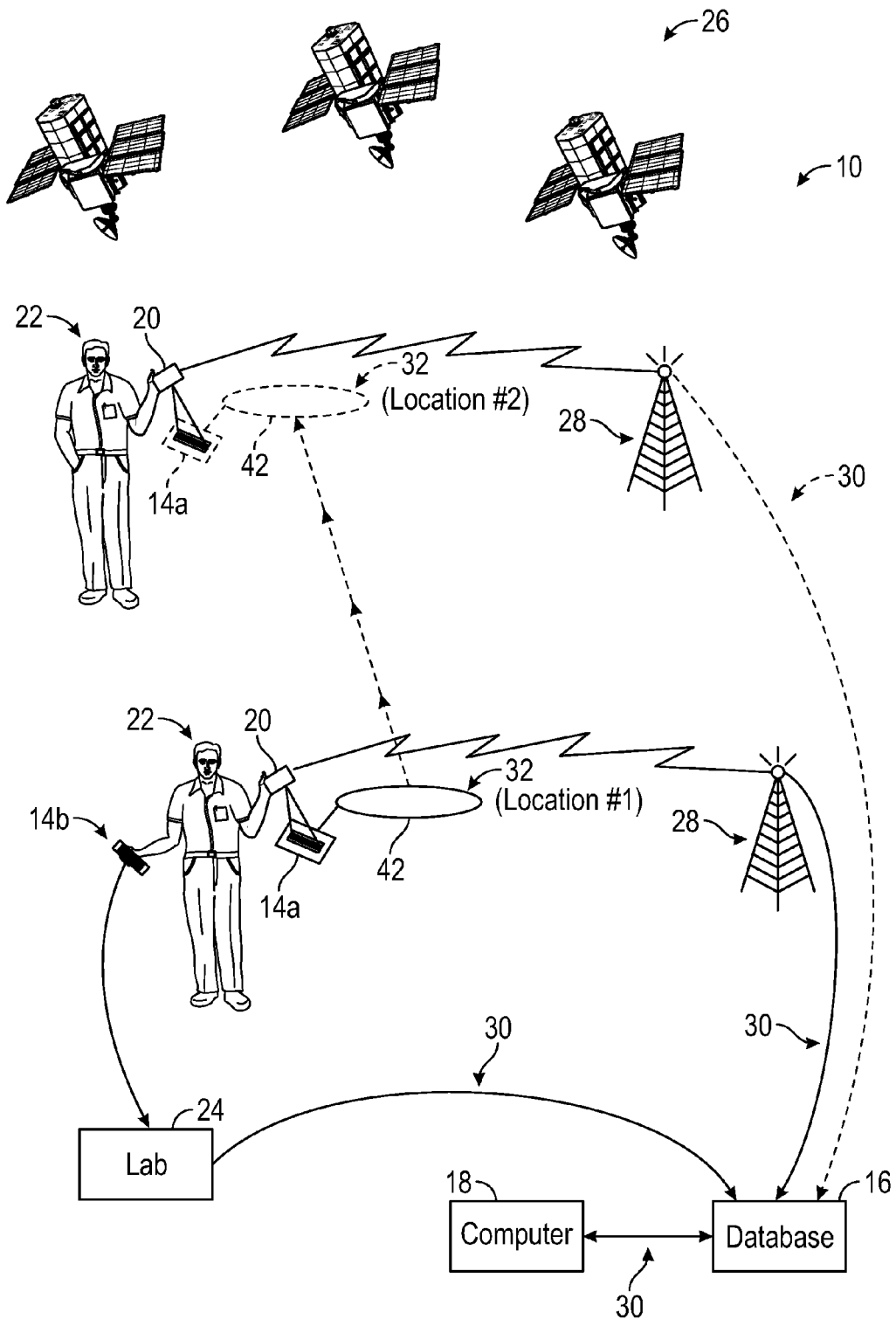
FIG. 1 is a diagrammatic view of a body tracking and identification system in accordance with the present invention.

Referring now to the drawings and the illustrative embodiments depicted therein, a body tracking and identification system 10 (FIG. 1) and method (FIG. 2) facilitates the rapid processing of victims, even permitting the use of mass burials prior to positive identification of individual victims, in a manner that allows victims to later be positively identified and reunited or returned to family members or next of kin, even if the victim or victims have been moved multiple times after the original event that led to their death, injury, or illness. Body tracking and identification system 10 includes a two-part tag 14 including a tag portion 14a and a container portion 14b (FIGS. 1 and 3), a centralized computer database 16 in communication with one or more computers 18, and a handheld computer 20, such as a "smart phone" device, that is carried and used by an aid worker 22. System 10 further utilizes a laboratory 24 for conducting DNA analysis or other victim-identification methods, a GPS satellite network 26, cellular or other wireless data networks 28, and wired data communications 30 (FIG. 1). Body tracking and identification system 10 is useful for determining the identity of a victim 32, even if the victim is later moved to a different location, such as shown with a phantom line in FIG. 1, before a positive identification is made, as will be described in more detail below.

Figure 2:
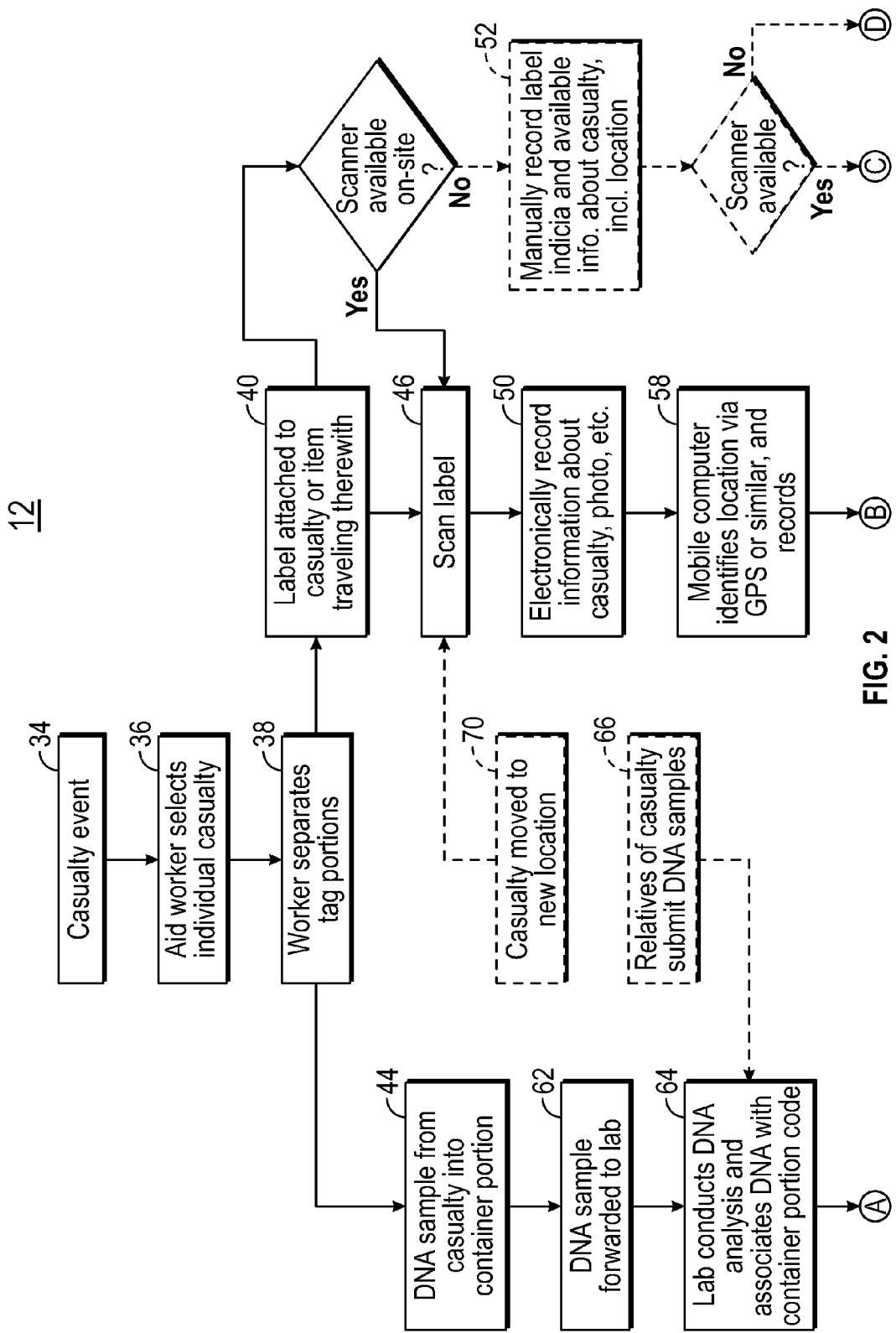
FIG. 2 is a flow diagram depicting a method in accordance with the present invention.
Figure 2:
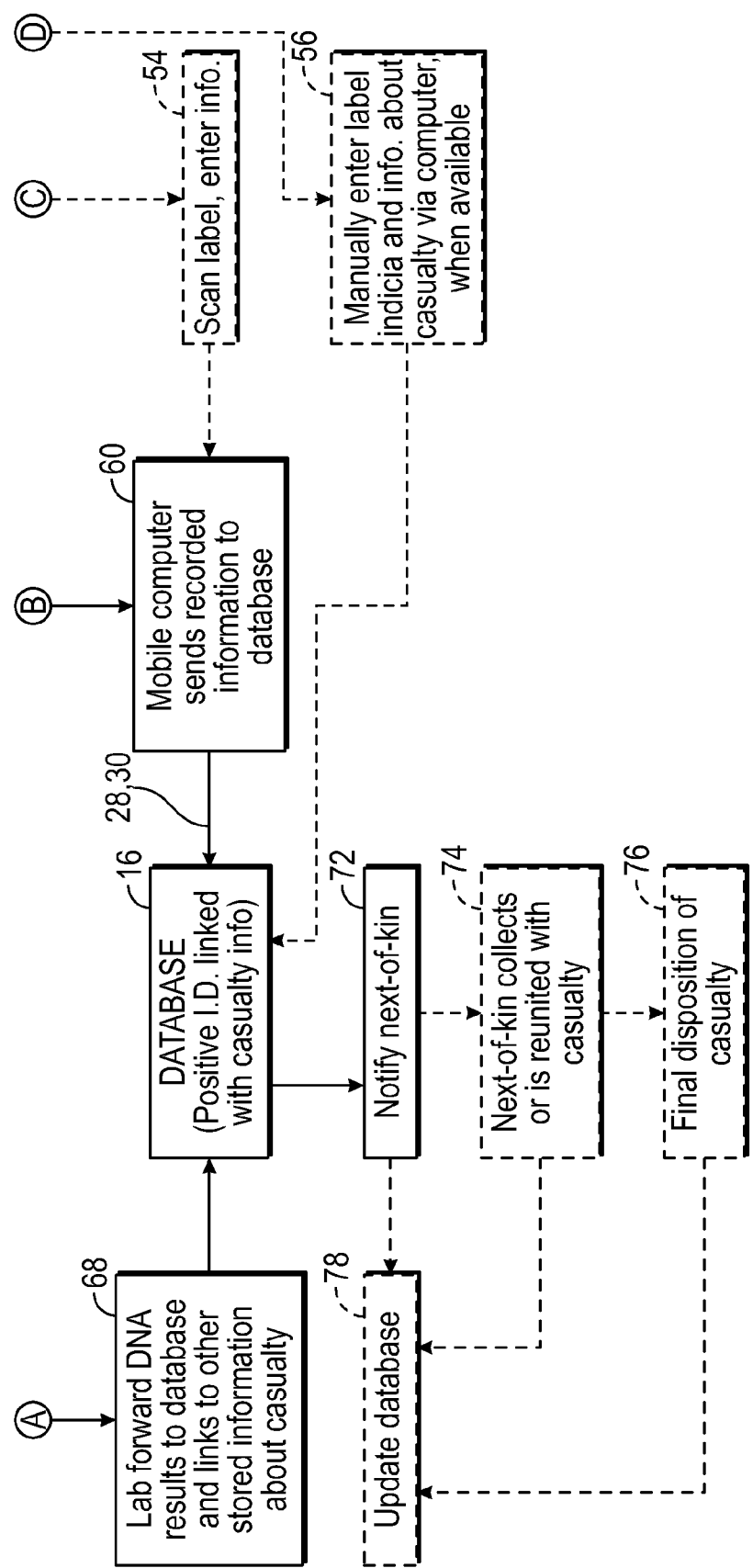

Body tracking and identification system 10 is used to implement the method 12 once a casualty event 34 has occurred (FIG. 2). Once aid workers arrive at the scene of the disaster, accident, or other casualty event where victims in need of aid or handling are present, the individual aid workers 22 select 36 individual victims for tagging, collecting a DNA sample, and subsequent identification. Aid worker 22 separates 38 container portion 14b from tag portion 14a, and attaches 40 tag portion 14a to the victim 32. Tag portion 14a may be attached directly to the victim 32 via any known method (e.g., wire-tie, plastic zip-tie, hook-and-loop fastener, or the like), or may be attached to a body bag 42 (FIG. 1) or other object that contains or is associated with victim 32. At this time, aid worker 22 also collects 44 a tissue sample from victim 32, such as a hair or fingernail sample, and places the sample into container portion 14b, which aid worker 22 initially keeps on his/her person, such as in a collection bag or the like. If aid worker 22 is carrying a functioning handheld computer 20, the handheld computer is used to scan 46 indicia 48b on tag portion 14a, and if time allows, may electronically record 50 any desired information or data to aid in identifying victim 32, such as name, sex, age, height, weight, hair color, eye color, race, and identifying marks (e.g., tattoos, scars, etc.), some of which may be obtained from identification documents found on the victim. Optionally, aid worker 22 may use handheld computer 20 to photograph victim 32. Handheld computer 20 processes this information using software or executable programming to create a victim data file that is stored locally on the handheld computer 20 and/or is immediately or later forwarded to centralized database 16. At this point, aid worker 22 is free to leave the first victim and repeat the above-described steps for another victim.

Optionally, if an operational handheld computer 20 is not available to aid worker 22 at the location of a given victim 32, aid worker 22 may manually record 52 indicia 48b on tag portion 14a, as well as any other information available regarding the victim, including the victim's present location. If an operational scanner later becomes available, the aid worker 22 may scan 54 the manually-recorded indicia 48b and enter the manually recorded information into the functional handheld computer 20. Otherwise, the aid worker 22 or other person may manually enter 56 (e.g., by typing into a computer) the label indicia and the other information that was manually recorded by the aid worker at the time that tag portion 14a was attached to the victim 32.

After label scanning 46 and electronic recording 50 of information, photos, etc. regarding victim 32, handheld computer 20 identifies its location using internal GPS circuitry in communication with GPS satellite network 26, while aid worker 22 is still located adjacent victim 32, and records 58 the location and associates the location information with the electronically recorded information and scanned label from tag portion 14a. Once all of the information has been collected utilizing a software program operated on handheld computer 20, aid worker 22 may command handheld computer 20 to upload 60 the recorded information to database 16, such as via cellular or wireless network 28 and/or wired data communications 30.

Once the aid worker 22 has completed the above-described initial processing of individual victims 32, and has collected a sufficient or desired number of container portions 14b containing tissue samples, container portions 14b are deposited at a collection site and are then forwarded 62 to laboratory 24, which conducts DNA analysis (or other type of positive identification process) on the sample and uses its own computers and indicia scanners to associate the DNA information with the saved victim data file that is associated with indicia 48a found on container portion 14b. Once laboratory 24 has received the tissue samples in respective container portions 14b, the lab 24 conducts DNA analysis and associates 64 the resulting DNA sequence with the indicia 48a found on container portion 14b using its own computers and/or scanners. Optionally, laboratory 24 compares the DNA sequences determined from the DNA samples collected in container portions 14b with a DNA sequence database and/or from DNA samples collected 66 from relatives of victims 32. Laboratory 24 uploads 68 the DNA sequences with their associated indicia to database 16, where the DNA sequence (and positive identification of the victim, if available) is entered into the victim data file that was originally created by the aid worker 22 after the casualty event 34.

At this point, database 16 contains a victim data file containing data regarding an individual victim that is sufficient to (1) identify the victim by name, or at least by DNA sequence, (2) link the victim's identity with other information (such as physical characteristics of the victim) that was collected in the field after the casualty event 34, and (3) identify the current location of the victim 32. In the event that victim 32 is moved from its original location where the victim was tagged 40 (e.g. the location of casualty event 34, or a subsequent location to which victim 32 was moved), and the indicia 48b on tag portion 14a is again scanned 46 by an aid worker 22 using handheld computer 20, which records its determined location at the subsequent location to which victim 32 was moved 70, and the new location data is forwarded 60 to database 16 in substantially the same manner describe above. In the event that a scan is forgotten or otherwise missed during a move of a particular victim from one location to another, it still may be possible to identify that particular victim's current location, or the victim's likely current location, such as by tracking the current locations of other victims who were collocated with the victim at the victim's last know location.

It will be appreciated that the method allows a victim's DNA sequence to be determined substantially any length of time after casualty event 34, and that the victim 32 may be moved or relocated substantially any length of time following the casualty event 34, even months or years after the original casualty event, so that database 16 can be updated and each victim's data record completed at substantially any length of time after casualty event 34. This facilitates rapid triage and processing of victims immediately following a casualty event, while substantially avoiding difficulties with identifying and locating victims that can otherwise occur if victims are not otherwise carefully identified and thoroughly documented before they are moved.

Once a particular victim's data log is completed, including positive identification and current location, next of kin may be identified and notified 72. If desired, the next of kin may be reunited with the victim (if the victim is alive) or may collect the victim's remains 74 for final disposition of the victim 76, such as reburial or cremation. Optionally, the victim's database record may be updated 78 to reflect that next of kin has been notified 72, to show that the next of kin has collected or has been reunited with the victim 74, and to reflect the final disposition of the victim 76.

Figure 3:
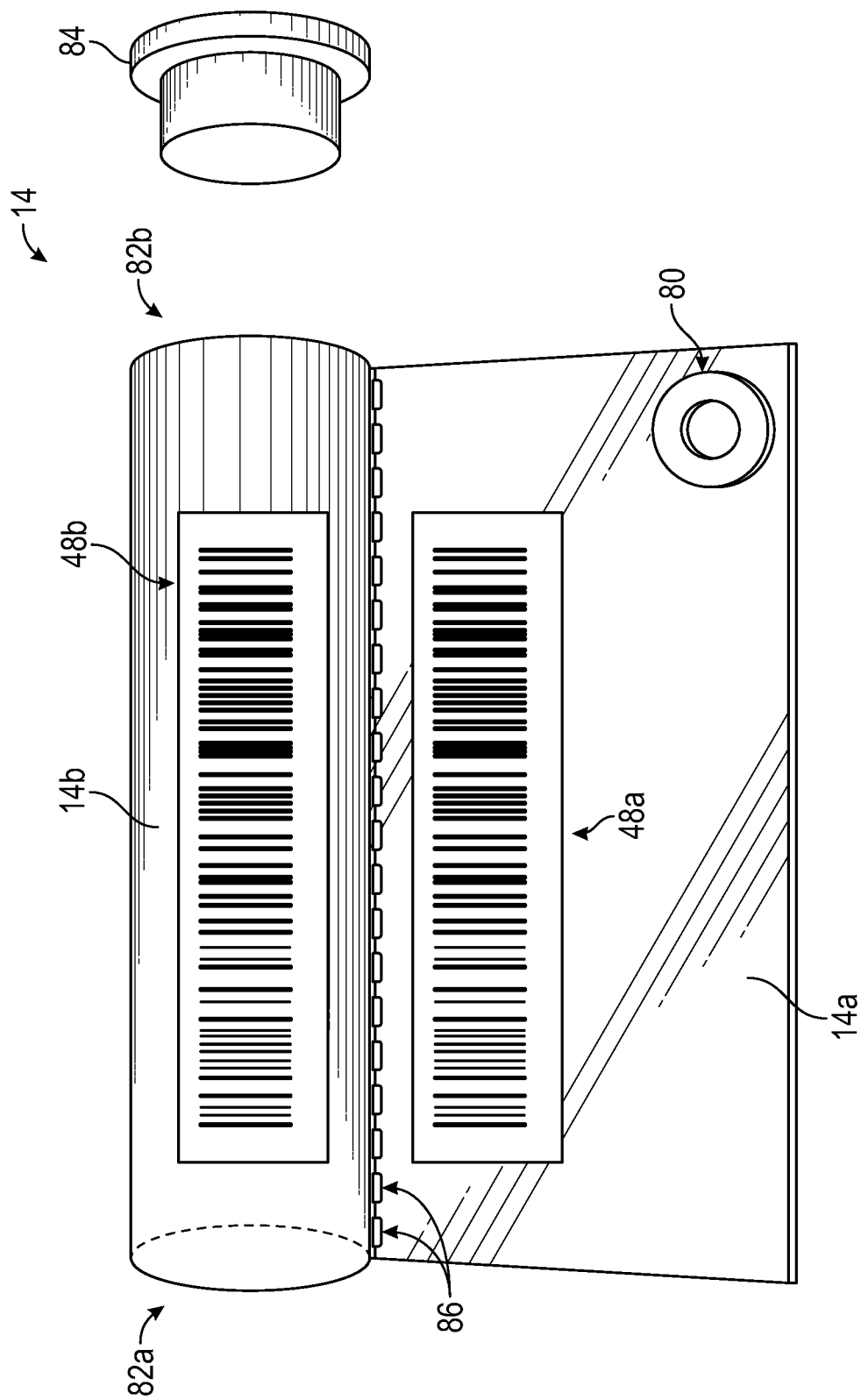
FIG. 3 is a perspective view of a two-part tag for use with the body tracking and identification system.

In the illustrated embodiment of FIG. 3, two-part tag 14 is made of resinous plastic that is resistant to deterioration and leakage in the presence of weather and/or chemicals, and may be injection molded or formed from sheet material, for example. Tag portion 14a is generally planar and is sufficiently large to be readily identifiable and visually read by aid workers 22, and may include an attachment provision, such as a reinforced opening 80 for receiving a loop of material (such as a cord or wire, wire-tie, plastic zip-tie, or the like) that allows tag portion 14a to be attached to victim 32 or body bag 42, for example. In this illustrated embodiment, container portion 14b is a substantially hollow cylinder having a closed end 82a and an open end 82b, which is selectively closable via an end cap 84. Tag indicia 48a is substantially identical or correlatable to container portion indicia 48b, both of which may be made up of one or more different types of indicia, preferably including at least one human-readable indicia, such as combinations of letters and/or numbers. For example, the indicia may include printed barcodes or QR codes, RFID chips, alphanumeric sequences, or the like, and, optionally, may include raised indicia that can be transferred to a sheet of paper or other thin material via a rubbing transfer, such as with a wax crayon, charcoal, graphite, carbon paper, or the like.

Once a DNA sample has been placed inside of container portion 14b, end cap 84 is used to seal open end 82b until it is subsequently opened at laboratory 24. Optionally, a sealant material or tamper-evident marking or screw threads may be used to ensure that end cap 84 is not removed until it arrives at laboratory 24. A perforation line 86 facilitates the separation 38 of tag portion 14a from container portion 14b by aid worker 22, such as by breaking or snapping, tearing, or the like. It is envisioned that other types of two-part tags may be used without departing from the spirit and scope of the present invention. For example, bags made of flexible film material, with at least one sealable chamber and a separable tag portion, removable label, or the like, may be used instead of a rigid material.

It will be appreciated that many types of data or information may be collected regarding the casualty event 34, victim 32, aid worker 22, DNA sequence, and the like. For example, handheld computer 20 runs a mobile application in the form of a computer software program or executable code that allows aid worker 22 to perform the initial actions described above for creating the victim data file when a given victim is first being tagged. This may involve authentication of the aid worker using a login identification and password, biometric scan (e.g., fingerprint), or the like to access and use the mobile application. Pertinent information about the casualty event and the name or identity of the organization that is performing the identification and tagging steps is entered and/or displayed at computer 20 so that aid worker 22 can confirm that victim information will be logged and associated with the correct event. It will be appreciated that much or all of the organizational structure used to organize and update data for victim data files may be performed in advance of a casualty event, and may be maintained at substantially any location, and then quickly customized for use once a casualty event has occurred, such as by identifying the aid organizations, teams, sub-teams, and individual field workers who will be entering data at or near the scene of the casualty event.

Database 16 may be structured to contain identifying information regarding the identity of each field worker who has scanned a give indicia 48a, including the field worker's team or sub-team identity, and the associate aid or recovery organization's identity. Other data stored in the database 16 may include a given tag's 14a indicia 48a, a name or other identifying information about the casualty event 22, and available information about the victim such as the victim's name, address, and identifiable traits, the identity of the victim's next of kin, indicia 48a associated with the victim, and photographs of the victim and/or of identifying documents or information found with the victim. Still other data stored in the database may include the next of kin's address or other contact information, and each location where the victim has been located and their associated indicia 48a scanned, including latitude/longitude coordinates and/or place name, the date and time at which the scan was made, and the identity of the field worker who made a particular scan or record.

Thus, the victim tracking and identification system and method of the present invention allows for the rapid initial processing of victims of a casualty event, so that victims can quickly be moved, and so that deceased victims can be buried or moved in groups, but in a way that facilitates later identification of victims for the purpose of notifying family members or other loves ones or interested parties and, optionally, for reuniting the victims, whether living or deceased, with family members. The system allows aid workers to move quickly from victim to victim while accurately collecting information that will be useful in later identifying the victim and leaving a tag or some form of indicia that will stay with the victim through any moves that may subsequently appear. While the system and method are facilitated by the aid workers' use of handheld computers in the field, it is also possible to collect and record necessary information even without a functioning handheld computer for each worker, so that aid workers' activities may be only slightly hampered by lack of a functioning handheld computer.

Changes and modifications to the specifically-described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A method of identifying and tracking victims of a casualty event, said method comprising:
   locating an individual victim of the casualty event;
   separating a tag portion from a container portion of a two-part tag, wherein the tag portion includes a tag indicia and the container portion includes a container indicia corresponding to the tag indicia;
   attaching the tag portion to the victim or to an object associated with the victim, whereby the tag portion remains with the victim;
   electronically scanning and recording the tag indicia to an electronic victim data file using a handheld computer operating a computer software program;
   determining and recording in the victim data file, with the handheld computer, the geographical location of the tag portion that remains with the victim in a first location;
   removing a tissue sample from the victim;
   placing the tissue sample into the container portion of the two-part tag;
   forwarding the container portion with the tissue sample to a remote location for DNA analysis of the tissue sample;
   identifying the victim via the DNA analysis of the tissue sample; and
   electronically updating the victim data file in a computer database to reflect the victim identity.

2. The method of claim 1, further comprising:
   moving the victim to a second location;
   recording the geographical location of the tag portion that remains with the victim in the second location; and
   electronically updating the victim data file in the computer database to reflect the recorded second location.

3. The method of claim 1, wherein the tag indicia includes both human-readable markings and machine-readable indicia, the machine-readable indicia comprising at least one chosen from (i) a bar code, (ii) a QR code, (iii) a raised bar code, (iv) a raised QR code, and (v) an RFID chip.

4. The method of claim 3, wherein the container indicia includes both human-readable markings and machine-readable indicia, the machine-readable indicia comprising at least one chosen from (i) a bar code, (ii) a QR code, (iii) a raised bar code, (iv) a raised QR code, and (v) an RFID chip.

5. The method of claim 1, wherein said separating the tag portion from the container portion of the two-part tag comprises breaking the two-part tag along a weakened line established between the tag portion and the container portion.

6. The method of claim 1, further comprising wirelessly transmitting to the computer database, with the handheld computer, the victim data file including the recorded tag indicia and the recorded geographical location.

7. The method of claim 1, wherein the tag indicia includes machine-readable indicia, the machine-readable indicia comprising at least one chosen from a raised bar code and a raised QR code, and wherein said electronically scanning and recording the tag indicia comprises first creating a rubbing of the tag indicia to create a transferred indicia and then electronically scanning the transferred indicia.

8. A method of identifying and tracking victims of a casualty event, said method comprising:
   locating an individual victim of the casualty event;
   separating a tag portion from a container portion of a two-part tag, wherein the tag portion includes a tag indicia and the container portion includes a container indicia corresponding to the tag indicia;
   attaching the tag portion to the victim or to an object associated with the victim, whereby the tag portion remains with the victim;
   recording the tag indicia;
   recording a geographical location of the tag portion that remains with the victim in a first location by using a handheld computer operating a computer software program;
   removing a tissue sample from the victim;
   placing the tissue sample into the container portion of the two-part tag;
   forwarding the container portion with the tissue sample to a remote location for DNA analysis of the tissue sample;
   electronically storing the recorded tag indicia and the recorded geographical location in victim data file in a computer database;
   moving the victim to a second location;
   recording the geographical location of the tag portion that remains with the victim in the second location;
   electronically updating the victim data file in the computer database to reflect the recorded second location;
   identifying the victim via the DNA analysis of the tissue sample; and
   electronically updating the victim data file in the computer database to reflect the victim identity.

9. The method of claim 8, wherein the tag indicia is a machine-readable indicia and said recording the tag indicia comprises electronically detecting the tag indicia.

10. The method of claim 9, wherein the machine-readable indicia comprises at least one chosen from (i) an alphanumeric sequence, (ii) a bar code, (iii) a QR code, (iv) a raised bar code, (v) a raised QR code, and (vi) an RFID chip.

11. The method of claim 8, wherein the tag indicia is a machine-readable indicia comprising at least one chosen from (i) a raised alphanumeric sequence, (ii) a raised bar code, (iii) a raised QR code, and wherein said recording the tag indicia comprises obtaining a rubbing transfer of the tag indicia and electronically detecting the rubbing transfer.

12. The method of claim 8, wherein said separating the tag portion from the container portion of the two-part tag comprises tearing a weakened line established between the tag portion and the container portion.

13. The method of claim 12, wherein the container portion comprises a generally cylindrical shape and an openable end cap.

14. The method of claim 13, wherein the tag portion comprises a generally planar and substantially rigid sheet material.

15. The method of claim 8, wherein:
   said recording the tag indicia comprises electronically scanning the tag indicia with a handheld computer operating a software program;

said recording the geographical location of the tag portion comprises determining the geographical location with GPS circuitry associated with the handheld computer in response to a command from the software program; and said method further comprises associating, with the software program, the recorded tag indicia with the recorded geographical location of the tag to create the victim data file.

16. The method of claim 15, further comprising wirelessly transmitting to the computer database, with the handheld computer, the victim data file including the recorded tag indicia and the recorded geographical location.

17. The method of claim 15, further comprising entering identifying information about the victim into the victim data file with the handheld computer, the identifying information including one or more chosen from: (i) name, (ii) sex, (iii) age, (iv) height, (v) weight, (vi) hair color, (vii) eye color, (viii) race, (ix) identifying marks, and (x) a photograph.

* * * * *